United States Patent
Lee et al.

(10) Patent No.: US 12,438,524 B2
(45) Date of Patent: Oct. 7, 2025

(54) THERMAL TRANSITION FILTER FOR A SUPERCONDUCTING CIRCUIT SYSTEM

(71) Applicant: NORTHROP GRUMMAN SYSTEMS CORPORATION, Falls Church, VA (US)

(72) Inventors: Aaron Christopher Lee, Hyattsville, MD (US); Anthony Joseph Przybysz, Linthicum, MD (US); James R. Medford, Columbia, MD (US); John X. Przybysz, Severna Park, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 194 days.

(21) Appl. No.: 18/365,039

(22) Filed: Aug. 3, 2023

(65) Prior Publication Data
US 2025/0047264 A1 Feb. 6, 2025

(51) Int. Cl.
*H03H 11/04* (2006.01)
*G06N 10/40* (2022.01)

(52) U.S. Cl.
CPC ............ *H03H 11/04* (2013.01); *G06N 10/40* (2022.01)

(58) Field of Classification Search
CPC ................................ H03H 11/04; G06N 10/40
See application file for complete search history.

(56) References Cited

U.S. PATENT DOCUMENTS

| | | | |
|---|---|---|---|
| 8,159,313 B2* | 4/2012 | Uchaykin | H05K 1/165 333/185 |
| 2015/0236247 A1* | 8/2015 | Behin-Aein | G11C 11/16 335/84 |
| 2020/0035086 A1 | 1/2020 | Siminoff et al. | |
| 2020/0072772 A1* | 3/2020 | Graninger | H10N 69/00 |
| 2020/0350869 A1* | 11/2020 | Miller | H03H 7/06 |
| 2020/0411937 A1 | 12/2020 | Whittaker et al. | |
| 2024/0244985 A1* | 7/2024 | Harrabi | H10N 60/12 |

OTHER PUBLICATIONS

WOISR: Notification of Transmittal of the International Search Report and the Written Opinion of the International Searching Authority, or the Declaration, mailed Jun. 14, 2025 for corresponding PCT/US2024/036714.

* cited by examiner

*Primary Examiner* — Metasebia T Retebo
(74) *Attorney, Agent, or Firm* — Tarolli, Sundheim, Covell & Tummino LLP

(57) ABSTRACT

One example includes a superconducting circuit system. The system includes at least one bias input configured to provide a bias current to a superconducting device via at least one superconducting device bias line coupled to the superconducting device during operation of the superconducting device. The system further includes a thermal transition filter system interconnecting the superconducting device bias line and the bias input. The thermal transition filter system provides a current path to divert noise current provided from the bias input away from the superconducting device during a temperature transition from a first temperature to a second temperature. The first temperature is greater than a highest superconducting critical temperature associated with the superconducting circuit system and the second temperature is less than a lowest superconducting critical temperature for the superconducting circuit system.

18 Claims, 3 Drawing Sheets

THERMAL TRANSITION FILTER FOR A SUPERCONDUCTING CIRCUIT SYSTEM

GOVERNMENT INTEREST

The invention was made under Government Contract. Therefore, the US Government has rights to the invention as specified in that contract.

TECHNICAL FIELD

This disclosure relates generally to superconducting computer systems, and more specifically to a thermal transition filter system for a superconducting circuit system.

BACKGROUND

Superconducting circuits operate based on the behavior of superconducting metals in a cryogenic environment. For example, at very low cryogenic temperatures (e.g., less than 1K), superconducting metals can exhibit superconductivity in which electrons can propagate with approximately zero resistance. Typical superconducting circuits can operate based on being provided bias currents on bias inputs, such as to affect the triggering of Josephson junctions and/or to provide magnetic flux in superconducting loops. As a superconducting circuit is cooled from a typical ambient temperature environment to a cryogenic temperature, and thus a temperature less than a superconducting critical temperature for superconducting devices, noise currents can exhibit and propagate to the superconducting circuit via the bias inputs. Such noise currents can cause magnetic flux to exhibit on the superconducting loops and can remain, undissipated, causing flux traps that can deleteriously affect the operation of the superconducting circuit after the superconducting circuit is reduced to the cryogenic temperature.

SUMMARY

One example includes a superconducting circuit system. The system includes at least one bias input configured to provide a bias current to a superconducting device via at least one superconducting device bias line coupled to the superconducting device during operation of the superconducting device. The system further includes a thermal transition filter system interconnecting the superconducting device bias line and the bias input. The thermal transition filter system provides a current path to divert noise current provided from the bias input away from the superconducting device during a temperature transition from a first temperature to a second temperature. The first temperature is greater than a highest superconducting critical temperature associated with the superconducting circuit system and the second temperature is less than a lowest superconducting critical temperature for the superconducting circuit system.

Another example includes a method for fabricating a superconducting circuit. The method includes coupling a superconducting device to at least one superconducting device bias line. The method also includes coupling a thermal transition filter system to the at least one superconducting device bias line. The thermal transition filter system comprising a conductive metal segment. The method further includes coupling at least one bias input to the thermal transition filter system, such that the thermal transition filter system is configured to divert noise current provided from the at least one bias input through the conductive metal segment during a temperature transition from a first temperature to a second temperature. The first temperature is greater than a highest superconducting critical temperature associated with the superconducting circuit system and the second temperature is less than a lowest superconducting critical temperature for the superconducting circuit system.

Another example includes a superconducting circuit system. The system includes a superconducting device and a bias input that provides a bias current to the superconducting device during operation of the superconducting device. The system also includes a superconducting device bias line coupled to the superconducting device and coupled to the respective at least one bias input. The system further includes a thermal transition filter system interconnecting the superconducting device bias line and the bias input. The thermal transition filter system comprises at least one superconducting filter bias line interconnecting the at least one bias input and the at least one superconducting device bias line. The at least one superconducting filter bias line has a lower superconducting critical temperature than the at least one superconducting device bias line. The thermal transition filter system also includes a conductive metal segment that is coupled to the at least one bias input and the at least one superconducting filter bias line, such that the thermal transition filter system is configured to divert noise current provided from the at least one bias input through the conductive metal segment during a temperature transition from a first temperature to a second temperature. The first temperature is greater than a highest superconducting critical temperature associated with the superconducting circuit system and the second temperature is less than a lowest superconducting critical temperature for the superconducting circuit system.

DETAILED DESCRIPTION

Figure 1:
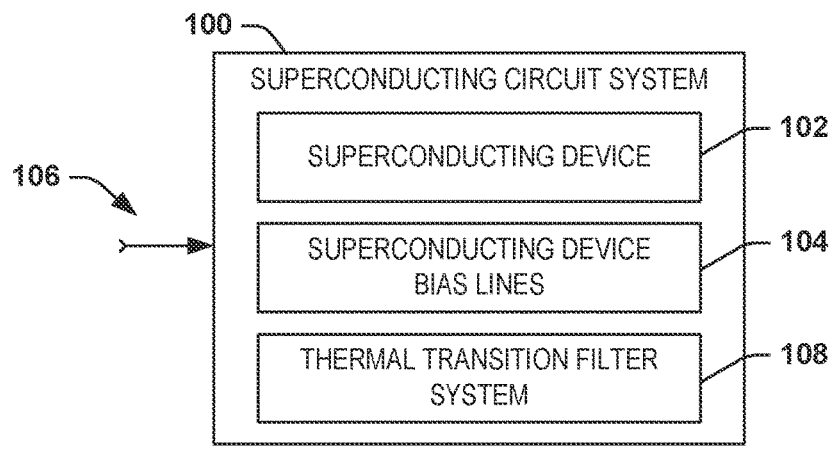
FIG. 1 illustrates an example block diagram of a superconducting circuit system.

This disclosure relates generally to superconducting computer systems, and more specifically to a thermal transition filter system for a superconducting circuit system. The superconducting circuit system can be fabricated as part of an integrated circuit (IC), to mitigate flux trapping that can occur in response to noise currents propagating on bias inputs while the superconducting circuit system is cooled to cryogenic temperatures. As described herein, the term "cryogenic temperature" refers to a temperature at which a given superconducting circuit system exhibits superconductivity for all superconducting metals therein, and is therefore lower than the lowest superconducting critical temperature of the superconducting circuit system. The thermal transition filter system can thus be integrated with the superconducting circuit system, instead of being coupled to the superconducting circuit system via connections external to the IC package, to mitigate flux trapping in the superconducting circuit system via noise currents provided on one or more bias inputs.

The superconducting circuit system can include a superconducting device that can correspond to one or more superconducting circuit devices (e.g., logic gates, qubits, etc.). The superconducting device can be coupled to at least one superconducting device bias line on which a respective bias current can be provided to the superconducting device. As an example, the superconducting device bias line(s) can be formed from a first type of superconducting metal. The superconducting device bias line(s) can, for example, include two superconducting device bias lines between which the superconducting device is arranged. The superconducting circuit system also includes the thermal transition filter system coupled between the superconducting device bias line(s) and at least one bias input. The thermal transition filter system is configured to provide a current path to divert noise current provided from the bias input(s) away from the superconducting device during a temperature transition from a first temperature to a second temperature. The first temperature can be greater than a highest superconducting critical temperature associated with the superconducting circuit system and the second temperature can be less than a lowest superconducting critical temperature for the superconducting circuit system.

As an example, the thermal transition filter system includes a conductive metal segment that is coupled to the bias input(s) that can correspond to the current path for the noise current. As described herein, the term "conductive metal" describes a metal that is not superconducting at any temperature, and is instead a metal that exhibits nominal conductivity at a non-zero resistance at cryogenic temperatures. As an example, the thermal transition filter system can also include at least one superconducting filter bias line that is coupled to the conductive metal segment and to the respective superconducting device bias line(s). The superconducting filter bias line(s) can be formed from a second type of superconducting metal, such that the superconducting filter bias line(s) have a superconducting critical temperature that is less than a superconducting critical temperature of the superconducting device bias line(s). Additionally, the superconducting filter bias line(s) can have a resistivity that is greater than a resistivity of the conductive metal segment at temperatures greater than the superconducting critical temperature of the superconducting filter bias line(s). Therefore, as the temperature decreases, the conductive metal segment provides a current path for dissipation of the noise current and the superconducting filter bias line(s) block conduction of the noise current to the superconducting device. Accordingly, the thermal transition filter system can mitigate spurious noise currents from propagating to the superconducting device as the temperature decreases to the cryogenic temperature, and thus mitigates flux trapping in the superconducting device.

FIG. 1 illustrates an example block diagram of a superconducting circuit system 100. The superconducting circuit system 100 can be implemented in any of a variety of superconducting computer applications. As an example, the superconducting circuit system can be implemented as or as part of an integrated circuit (IC), and can therefore be provided in an IC chip package.

The superconducting circuit system 100 includes a superconducting device 102 that can correspond to one or more superconducting circuit devices (e.g., logic gates, qubits, etc.). The superconducting circuit system 100 includes at least one superconducting device bias line 104 to which the superconducting device 102 is coupled. During nominal operation of the superconducting circuit system 100, a bias current can be provided from at least one bias input, demonstrated at 106, and onto the superconducting device bias line(s) 104 to provide a respective bias current to the superconducting device 102. The superconducting device bias line(s) 104 can, for example, include two superconducting device bias lines 104 between which the superconducting device 102 is arranged.

The superconducting circuit system 100 also includes a thermal transition filter system 108. The thermal transition filter system 108 can be coupled between the superconducting device bias line(s) 104 and the bias input(s) 106. As an example, as the superconducting circuit system 100 cools from an ambient temperature to a cryogenic temperature, a spurious voltage can develop on the bias input(s) 106, which can thus provide a noise current that flows into the superconducting circuit system 100 from the bias input(s) 106. The thermal transition filter system 108 is configured to provide a current path to divert noise current provided from the bias input(s) 106 away from the superconducting device 102 during a temperature transition from a first temperature to a second temperature. The first temperature can correspond to a temperature that is greater than a highest superconducting critical temperature associated with the superconducting circuit system. The second temperature can correspond to a temperature that is less than a lowest superconducting critical temperature for the superconducting circuit system. coupled between the superconducting device bias line(s) 104 and at least one bias input. Therefore, as described herein, the thermal transition filter system 108 can operate to block the noise current(s) from flowing to the superconducting device bias line(s) 104, and therefore to the superconducting device 102.

As an example, the thermal transition filter system 108 includes a conductive metal segment that interconnects the bias input(s) 106 to form the current path for the noise current. For example, the thermal transition filter system 108 can also include at least one superconducting filter bias line that is coupled to the conductive metal segment and to the respective superconducting device bias line(s) 104. The superconducting device bias line(s) 104 and the superconducting filter bias line(s) can be formed from different superconducting metals, such that the superconducting filter bias line(s) have a superconducting critical temperature that is less than a superconducting critical temperature of the superconducting device bias line(s) 104. Additionally, the superconducting metal from which the superconducting filter bias line(s) are formed can have a resistivity that is greater than a resistivity of the conductive metal segment at temperatures greater than the superconducting critical temperature of the superconducting filter bias line(s). Therefore, as the temperature decreases, the superconducting filter bias line(s) can block conduction of the noise current to the superconducting device 102, and can instead divert the noise currents to the conductive metal segment for dissipation of the noise current based on the higher resistivity of the superconducting filter bias line(s) relative to the conductive metal segment. As a result, the noise current can thus flow from one of the bias input(s) 106 to the other through the conductive metal segment, thus mitigating flow of the noise current to the superconducting device 102.

Accordingly, the thermal transition filter system 108 can mitigate spurious noise currents from propagating to the superconducting device 102 as the temperature decreases to the cryogenic temperature, and thus mitigates flux trapping in the superconducting device 102. The arrangement of the superconducting circuit system 100 therefore provides a more effective manner of mitigating flux trapping in superconducting circuits than typical thermal filters. For example, typical thermal filters that implement resistors can dissipate energy in the form of heat, which can be antithetical to or more energy inefficient with respect to operation of the superconducting circuit at cryogenic temperatures. As another example, typical thermal filters are implemented external to the IC package that includes the superconducting circuit. Therefore, while potentially mitigating noise currents originating upstream of the thermal filter, noise currents that originate downstream of the thermal filter (e.g., on leads of the IC package between the thermal filter and the IC package) can still result in flux trapping in the superconducting circuit. However, by implementing a conductive metal to provide the current path for noise currents, and by implementing the very small-size thermal transition filter system 108 in the IC chip, packaged with the superconducting circuit, the thermal transition filter system 108 can effectively and efficiently mitigate flux trapping in the superconducting circuit. As described in greater detail herein, the thermal transition filter system 108 is designed to not interfere with normal operation of the superconducting device 102 at the operating cryogenic temperature.

Figure 2:
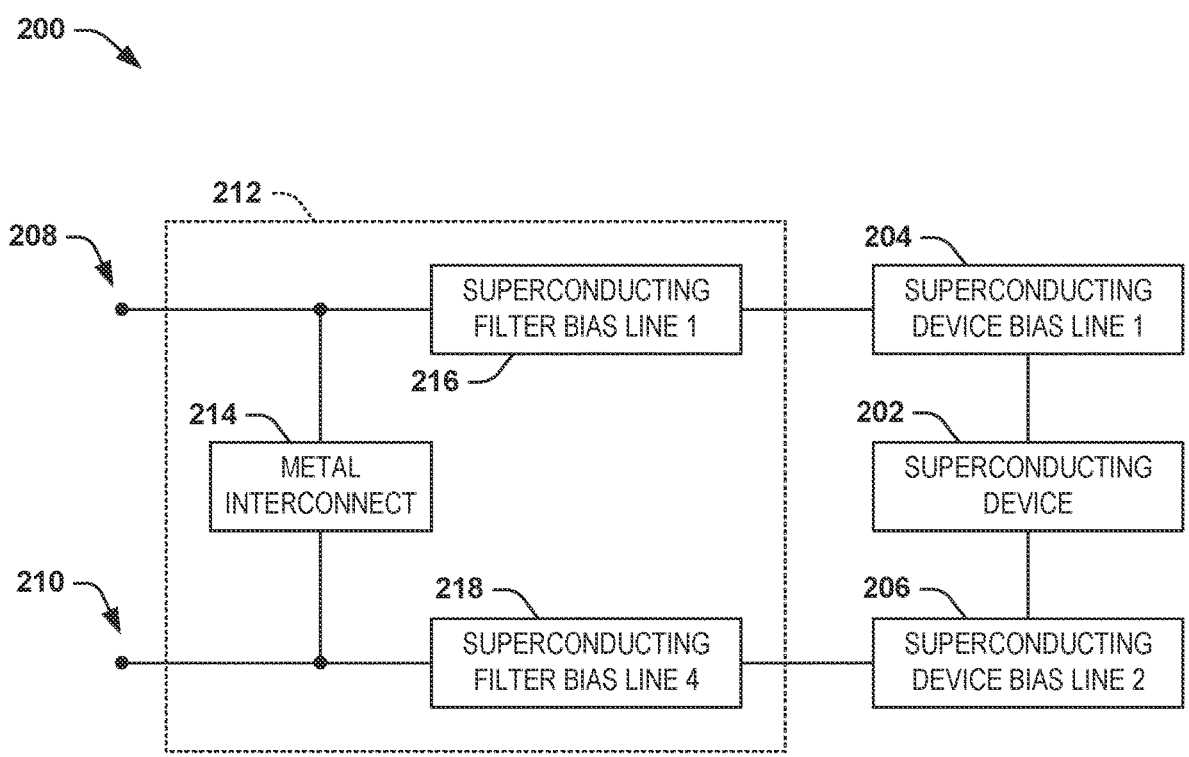
FIG. 2 illustrates an example of a superconducting circuit system.

FIG. 2 illustrates an example of a superconducting circuit system 200. The superconducting circuit system 200 can be implemented as or as part of an IC, and can therefore be provided in an IC chip package.

The superconducting circuit system 200 includes a superconducting device 202 that can correspond to one or more superconducting circuit devices (e.g., logic gates, qubits, etc.). The superconducting circuit system 200 includes a first superconducting device bias line 204 and a second superconducting device bias line 206 between which the superconducting device 202 interconnects. During nominal operation of the superconducting circuit system 200, a bias current can be provided from respective bias inputs, demonstrated at 208 and 210, respectively, and onto the superconducting device bias lines 204 and 206 to provide a respective bias current to the superconducting device 202.

The superconducting circuit system 200 also includes a thermal transition filter system 212. The thermal transition filter system 212 includes a conductive metal segment 214 that interconnects the bias inputs 208 and 210. As described above, as the superconducting circuit system 200 cools from an ambient temperature to a cryogenic temperature, a spurious voltage can develop on the bias input 208 and 210. The noise voltage can thus provide a noise current that flows into the superconducting circuit system 100 from the bias input 208 and 210. As described in greater detail herein, the conductive metal segment 214 can form a current path for the noise current, such that the noise current can flow through the conductive metal segment 214 between the bias inputs 208 and 210.

The thermal transition filter system 212 also includes a first superconducting filter bias line 216 and a second superconducting filter bias line 218 that are each coupled to the conductive metal segment and to the respective superconducting device bias lines 204 and 206. As an example, the superconducting device bias lines 204 and 206 can be formed of a first type of superconducting metal (e.g., niobium) and the superconducting filter bias lines 216 and 218 can be formed from a second type of superconducting material (e.g., tin, tantalum, aluminum) that is different from the first type of superconducting metal and which has a lower superconducting critical temperature than the first superconducting material. Additionally, the second type of superconducting metal from which the superconducting filter bias lines 216 and 218 are formed can have a resistivity that is greater than a resistivity of the conductive metal segment at temperatures greater than the superconducting critical temperature of the superconducting filter bias lines 216 and 218.

Therefore, as the temperature decreases, the superconducting filter bias lines 216 and 218 can block conduction of the noise current to the superconducting device 202, and can instead divert the noise current through the conductive metal segment 214 for dissipation of the noise current based on the higher resistivity of the superconducting filter bias lines 216 and 218 relative to the conductive metal segment 214. As a result, the noise current can thus flow from one of the bias inputs 208 and 210 to the other through the conductive metal segment 214, instead of to the superconducting device 202.

Figure 3:
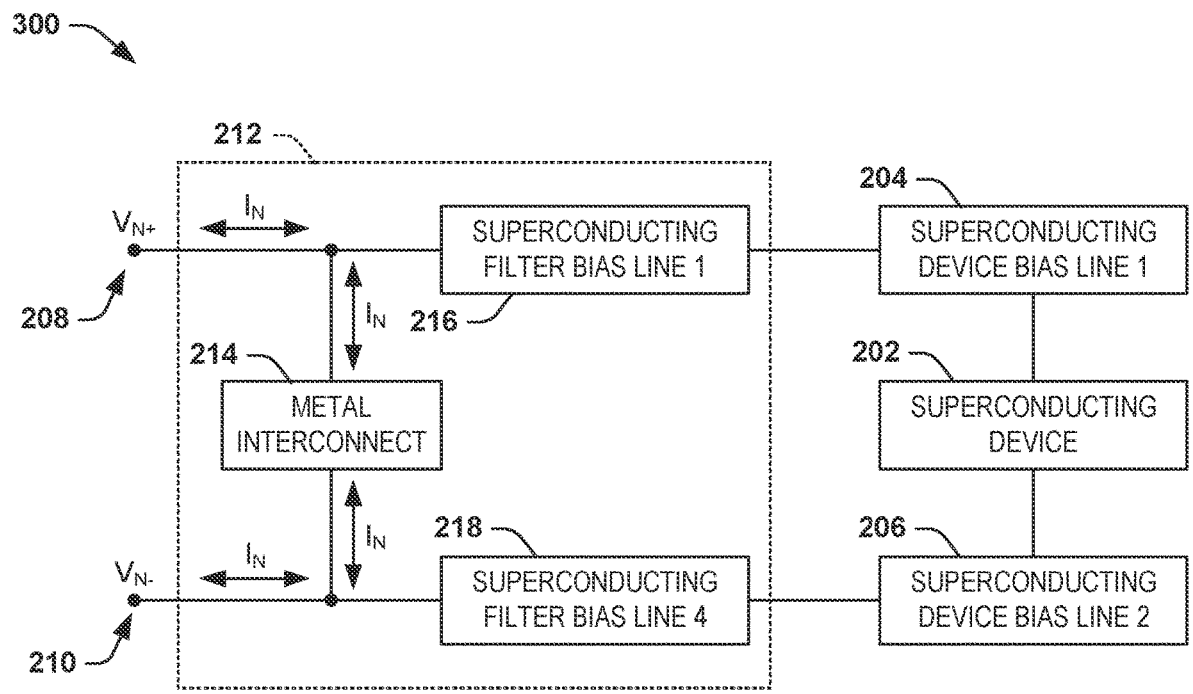
FIG. 3 illustrates another example of a superconducting circuit system.

FIG. 3 illustrates an example diagram 300 of the superconducting circuit system 200. The superconducting circuit system 200 corresponds to the superconducting circuit system 200 in the example of FIG. 2. Therefore, reference is to be made to the example of FIG. 2 in the following description of the example of FIG. 3, and like reference numbers are used in the example of FIG. 3 as are provided in the example of FIG. 2.

The diagram 300 represents a state of the superconducting circuit system 200 at a temperature that is greater than the second superconducting critical temperature that is associated with the superconducting filter bias lines 216 and 218. Therefore, the diagram 300 represents the state of the superconducting circuit system 200 in the process of cooling down to the operating cryogenic temperature, but is not yet at a final cryogenic temperature. Because the temperature is greater than the second superconducting critical temperature, the superconducting filter bias lines 216 and 218 are not yet superconducting, and are thus in a resistive state. As described above, the resistivity of the superconducting filter bias lines 216 and 218 is greater than the resistive of the conductive metal segment 214 at temperatures greater than the second superconducting critical temperature.

In the example of FIG. 3, a spurious voltage $V_{N+}$ and $V_{N-}$ is demonstrated on the respective bias inputs 208 and 210. As a result, a noise current Ix is provided into the superconducting circuit system 200. While the voltage is demonstrated as $V_{N+}$ and $V_{N-}$, the polarity is demonstrated in the example of FIG. 3 by example, and the noise current $I_N$ is therefore demonstrated as bidirectional. As described above, the superconducting filter bias lines 216 and 218 are not yet superconducting in the example of FIG. 3, and are instead in a resistive state, and the resistivity of the superconducting filter bias lines 216 and 218 is greater than the resistive of the conductive metal segment 214. Therefore, the noise current $I_N$ is substantially blocked from passing through the superconducting filter bias lines 216 and 218, and therefore cannot propagate on the superconducting device bias lines 204 and 206 to the superconducting device 202, even if the superconducting device bias lines 204 and 206 are superconducting (e.g., the temperature is between the first and second superconducting critical temperatures). Instead, the noise current $I_N$ propagates through the conductive metal segment 214 based on the lower resistivity of the conductive metal segment 214 relative to the superconducting filter bias lines 216 and 218. Accordingly, the noise current $I_N$ flows between bias inputs 208 and 210 through the conductive metal segment 214, instead of to the superconducting device 202. As a result, flux trapping in the superconducting device 202 is substantially mitigated while the superconducting circuit system 200 is cooled to the cryogenic temperature.

Figure 4:
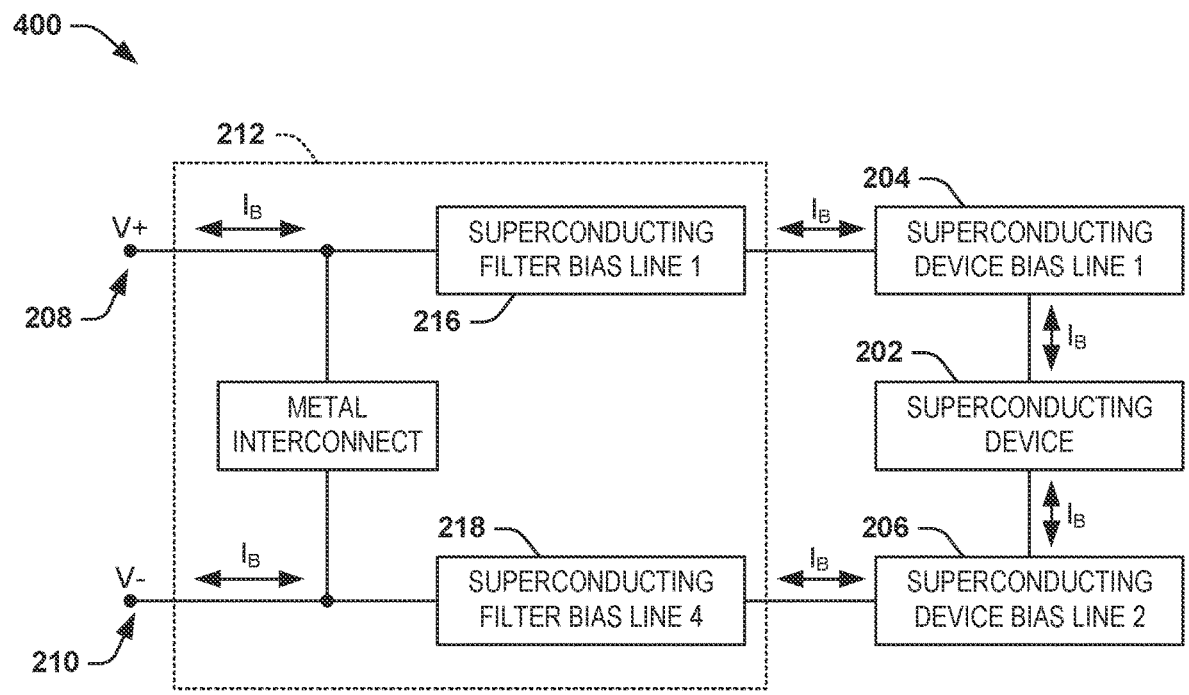
FIG. 4 illustrates another example of a superconducting circuit system.

FIG. 4 illustrates an example diagram 400 of the superconducting circuit system 200. The superconducting circuit system 200 corresponds to the superconducting circuit system 200 in the example of FIG. 2. Therefore, reference is to be made to the example of FIG. 2 in the following description of the example of FIG. 4, and like reference numbers are used in the example of FIG. 4 as are provided in the example of FIG. 2.

The diagram 400 represents a state of the superconducting circuit system 200 at a temperature that is less than the second superconducting critical temperature that is associated with the superconducting filter bias lines 216 and 218. Therefore, the diagram 400 represents the state of the superconducting circuit system 200 at a final operating cryogenic temperature, and thus at the nominal operating temperature of the superconducting circuit system 200. Because the temperature is less than the second superconducting critical temperature, the superconducting filter bias lines 216 and 218 are in a superconducting state, and are no longer resistive. As a result, the paths between the bias inputs 208 and 210 and the superconducting device 202 are completely superconducting.

In the example of FIG. 4, a bias current $I_B$, demonstrated as bidirectional by example, is provided from the bias inputs 208 and 210. Because the paths between the bias inputs 208 and 210 and the superconducting device 202 are completely superconducting, the bias current $I_B$ thus propagates through the superconducting filter bias lines 216 and 218 and through the superconducting device bias lines 204 and 206 to the superconducting device 202. Accordingly, the superconducting device 202 can be biased by the bias current $I_B$ during normal superconducting operation of the superconducting circuit system 200. Because the conductive metal segment 214 is still resistive, the bias current $I_B$ is blocked from flowing through the conductive metal segment 214 based on the zero-resistance path through the superconducting filter bias lines 216 and 218 and through the superconducting device bias lines 204 and 206. As a result, the thermal transition filter system 212 can be permanently included in the IC package in which the superconducting circuit system 200 is packaged to mitigate flux trapping while cooling down to the cryogenic temperature while not interfering with normal operation of the superconducting device 202 at the cryogenic temperature.

Figure 5:
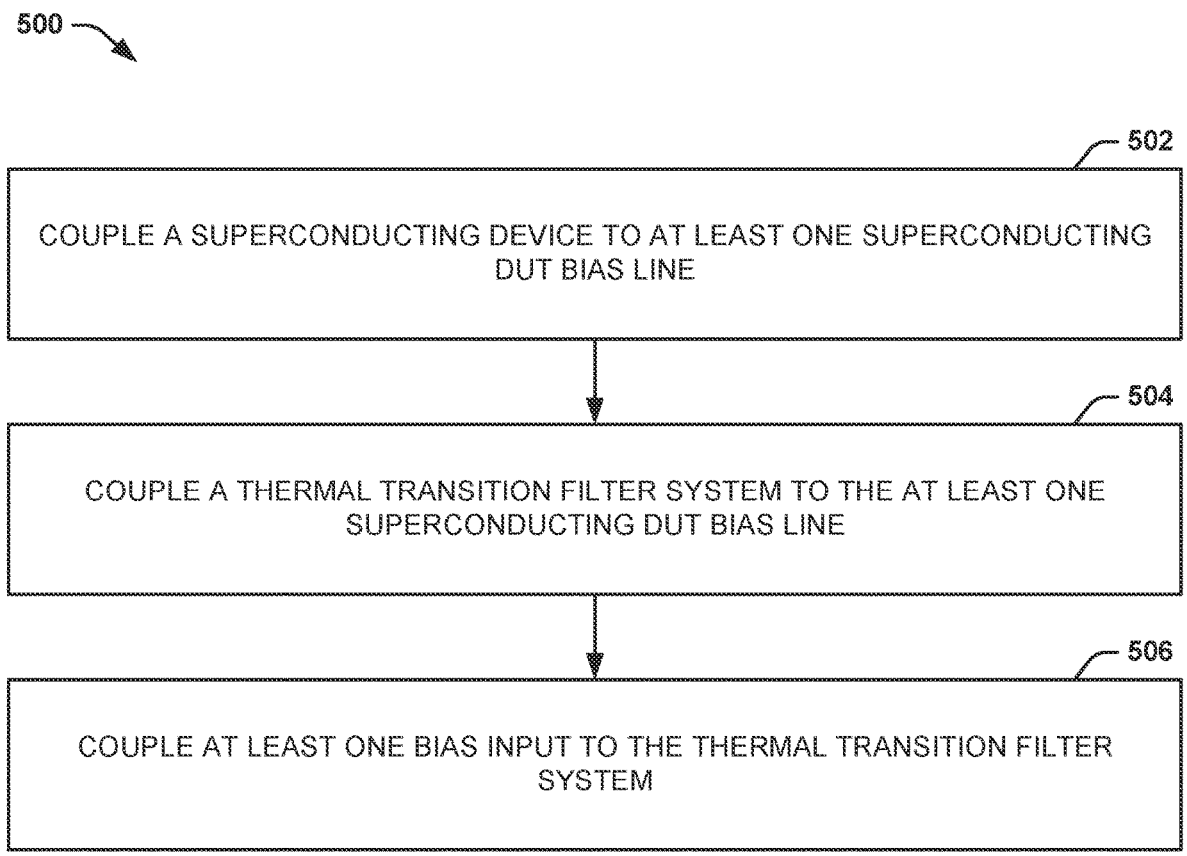
FIG. 5 illustrates an example of a method for fabricating a superconducting circuit.

In view of the foregoing structural and functional features described above, a methodology in accordance with various aspects of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example of a method 500 for fabricating a superconducting integrated circuit (IC). At 502, a superconducting device (e.g., the superconducting device 102) is coupled to at least one superconducting device bias line (e.g., the superconducting device bias line(s) 104). At 504, a thermal transition filter system (e.g., the thermal transition filter system 108) is coupled to the at least one superconducting device bias line. The thermal transition filter system can include a conductive metal segment (e.g., the conductive metal segment 214). At 506, at least one bias input is coupled to the thermal transition filter system. The thermal transition filter system is configured to divert noise current (e.g., the noise current $I_N$) provided from the at least one bias input through the conductive metal segment during a temperature transition from a first temperature to a second temperature. The first temperature can be greater than a highest superconducting critical temperature associated with the superconducting circuit system and the second temperature being less than a lowest superconducting critical temperature for the superconducting circuit system.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A superconducting circuit system comprising:
    at least one bias input configured to provide a bias current to a superconducting device via at least one superconducting device bias line coupled to the superconducting device during operation of the superconducting device; and
    a thermal transition filter system comprising at least one superconducting filter bias line interconnecting the at least one superconducting device bias line and the at least one bias input, the at least one superconducting filter bias line having a lower superconducting critical temperature than the at least one superconducting device bias line, the thermal transition filter system providing a current path to divert noise current provided from the at least one bias input away from the superconducting device during a temperature transition from a first temperature to a second temperature, the first temperature being greater than a highest superconducting critical temperature associated with the superconducting circuit system and the second temperature being less than a lowest superconducting critical temperature for the superconducting circuit system.

2. The system of claim 1, wherein the thermal transition filter system comprises a conductive metal segment that is coupled to the at least one bias input and is configured as the current path, such that the thermal transition filter system is configured to divert the noise current through the conductive metal segment during the temperature transition from the first temperature to the second temperature.

3. The system of claim 2, wherein the at least one bias input comprises a first bias input and a second bias input, wherein the conductive metal segment interconnects the first and second bias inputs.

4. The system of claim 2, wherein the conductive metal segment has a lower resistivity than the at least one superconducting filter bias line at a temperature greater than a superconducting critical temperature of the at least one superconducting filter bias line to divert the noise current through the conductive metal segment during the temperature transition from the first temperature to the second temperature.

5. The system of claim 2, wherein the at least one bias input comprises a first bias input and a second bias input, wherein the at least one superconducting device bias line comprises a first superconducting device bias line and a second superconducting device bias line that are each coupled to the superconducting device, wherein the at least one superconducting filter bias line comprises:

a first superconducting filter bias line interconnecting the first bias input and the first superconducting device bias line; and a second superconducting filter bias line interconnecting the second bias input and the second superconducting device bias line.

6. The system of claim 5, wherein the conductive metal segment interconnects the first and second bias inputs.

7. The system of claim 1, wherein the thermal transition filter system further comprises at least one superconducting filter bias line interconnecting the at least one bias input and the at least one superconducting device bias line, wherein the at least one superconducting filter bias line has a lower superconducting critical temperature than the at least one superconducting device bias line.

8. The system of claim 7, wherein the thermal transition filter system further comprises a conductive metal segment that is coupled to the at least one bias input and the at least one superconducting filter bias line, wherein the conductive metal segment is configured as the current path, such that the thermal transition filter system is configured to divert the noise current through the conductive metal segment during the temperature transition from the first temperature to the second temperature.

9. An integrated circuit (IC) comprising the superconducting circuit system of claim 1.

10. A method for fabricating a superconducting integrated circuit (IC), the method comprising:
coupling a superconducting device to at least one superconducting device bias line;
coupling at least one superconducting filter bias line of a thermal transition filter system to the at least one superconducting device bias line, the thermal transition filter system comprising a conductive metal segment; and
coupling at least one bias input to the at least one superconducting filter bias line, such that the thermal transition filter system is configured to divert noise current provided from the at least one bias input through the conductive metal segment during a temperature transition from a first temperature to a second temperature, the first temperature being greater than a highest superconducting critical temperature associated with the superconducting circuit system and the second temperature being less than a lowest superconducting critical temperature for the superconducting circuit system, and wherein the at least one superconducting filter bias line has a lower superconducting critical temperature than the at least one superconducting device bias line.

11. The method of claim 10, wherein coupling the at least one bias input comprises coupling a first bias input to the at least one superconducting filter bias line and coupling a second bias input to the at least one superconducting filter bias line, wherein the conductive metal segment interconnects the first and second bias inputs.

12. The method of claim 10, wherein the conductive metal segment has a lower resistivity than the at least one superconducting filter bias line at a temperature greater than a superconducting critical temperature of the at least one superconducting filter bias line to divert the noise current through the conductive metal segment during the temperature transition from the first temperature to the second temperature.

13. The method of claim 10, further comprising packaging the superconducting IC in a chip package.

14. A superconducting circuit system comprising:
a superconducting device;
at least one bias input configured to provide a bias current to the superconducting device during operation of the superconducting device;
at least one superconducting device bias line coupled to the superconducting device and coupled to the respective at least one bias input; and
a thermal transition filter system interconnecting the at least one superconducting device bias line and the at least one bias input, the thermal transition filter system comprising:
at least one superconducting filter bias line interconnecting the at least one bias input and the at least one superconducting device bias line, wherein the at least one superconducting filter bias line has a lower superconducting critical temperature than the at least one superconducting device bias line; and
a conductive metal segment that is coupled to the at least one bias input and the at least one superconducting filter bias line, such that the thermal transition filter system is configured to divert noise current provided from the at least one bias input through the conductive metal segment during a temperature transition from a first temperature to a second temperature, the first temperature being greater than a highest superconducting critical temperature associated with the superconducting circuit system and the second temperature being less than a lowest superconducting critical temperature for the superconducting circuit system.

15. The system of claim 14, wherein the at least one bias input comprises a first bias input and a second bias input, wherein the conductive metal segment interconnects the first and second bias inputs.

16. The system of claim 15, wherein the at least one superconducting device bias line comprises a first superconducting device bias line and a second superconducting device bias line that are each coupled to the superconducting device, wherein the at least one superconducting filter bias line comprises:
a first superconducting filter bias line interconnecting the first bias input and the first superconducting device bias line; and
a second superconducting filter bias line interconnecting the second bias input and the second superconducting device bias line.

17. The system of claim 14, wherein the conductive metal segment has a lower resistivity than the at least one superconducting filter bias line at a temperature greater than a superconducting critical temperature of the at least one superconducting filter bias line to divert the noise current through the conductive metal segment during the temperature transition from the first temperature to the second temperature.

18. An integrated circuit (IC) comprising the superconducting circuit system of claim 14.

* * * * *